(12) United States Patent
Glavaski et al.

(10) Patent No.: US 12,384,117 B2
(45) Date of Patent: Aug. 12, 2025

(54) SECURING A SECOND OBJECT TO A FIRST OBJECT

(71) Applicant: MULTIMATERIAL-WELDING AG, Biel (CH)

(72) Inventors: Slobodan Glavaski, Biel (CH); Valentin Bersier, Lausanne (CH)

(73) Assignee: MULTIMATERIAL-WELDING AG, Biel (CH)

( * ) Notice: Subject to any disclaimer, the term of this patent is extended or adjusted under 35 U.S.C. 154(b) by 259 days.

(21) Appl. No.: 17/780,179

(22) PCT Filed: Nov. 27, 2020

(86) PCT No.: PCT/EP2020/083773
§ 371 (c)(1),
(2) Date: May 26, 2022

(87) PCT Pub. No.: WO2021/105454
PCT Pub. Date: Jun. 3, 2021

(65) Prior Publication Data
US 2022/0410496 A1 Dec. 29, 2022

(30) Foreign Application Priority Data
Nov. 29, 2019 (CH) ...................................... 1517/19

(51) Int. Cl.
*B29C 65/06* (2006.01)
*B29B 9/10* (2006.01)
(Continued)

(52) U.S. Cl.
CPC ............ *B29C 65/0672* (2013.01); *B29B 9/10* (2013.01); *B29C 65/08* (2013.01); *B29C 65/562* (2013.01);
(Continued)

(58) Field of Classification Search
None
See application file for complete search history.

(56) References Cited

U.S. PATENT DOCUMENTS 10,562,237 B2 * 2/2020 Mayer ................. B29C 66/7392
10,576,691 B2 * 3/2020 Mayer ................. B29C 66/9221
(Continued)

FOREIGN PATENT DOCUMENTS

WO 2010072009 A1 7/2010
WO 2016198547 A1 12/2016
(Continued)

OTHER PUBLICATIONS

International Search Report and Written Opinion issued Jan. 28, 2021 in Intl Appl. No. PCT/EP2020/083773.

*Primary Examiner* — Michael N Orlando
*Assistant Examiner* — Abhishek A Patwardhan
(74) *Attorney, Agent, or Firm* — MEDLER FERRO WOODHOUSE & MILLS PLLC

(57) ABSTRACT

A method of manufacturing an assembly is disclosed. The method includes providing a first object, wherein the first object has an indentation with a sidewall, and providing the second object, wherein the second object has a lateral outer surface portion, and wherein one of the sidewall and the lateral outer surface portion is a thermoplastic material. The lateral outer surface portion of the second object is in physical contact with the sidewall of the first object, and mechanical energy is coupled into at least one of the first and second objects to cause energy absorption due to friction between the lateral outer surface portion and the sidewall, until a flow portion of the thermoplastic material becomes liquefiable and flows. After re-solidification of the thermoplastic material, the flow portion secures the second object to the first object.

10 Claims, 4 Drawing Sheets

(51) Int. Cl.
*B29C 65/00* (2006.01)
*B29C 65/08* (2006.01)
*B29C 65/56* (2006.01)
*B29L 31/30* (2006.01)
*B32B 3/12* (2006.01)
*B32B 3/26* (2006.01)
*B32B 27/06* (2006.01)
*B32B 27/20* (2006.01)

(52) U.S. Cl.
CPC .......... *B29C 65/565* (2013.01); *B29C 66/474* (2013.01); *B29C 66/721* (2013.01); *B29C 66/7254* (2013.01); *B29C 66/727* (2013.01); *B29C 66/7392* (2013.01); *B32B 3/12* (2013.01); *B32B 3/263* (2013.01); *B32B 27/065* (2013.01); *B32B 27/20* (2013.01); *B29L 2031/3076* (2013.01); *B32B 2605/18* (2013.01)

(56) References Cited

U.S. PATENT DOCUMENTS

| 11,027,497 | B2* | 6/2021 | Mayer | B29C 65/608 |
|---|---|---|---|---|
| 2007/0062628 | A1* | 3/2007 | Aeschlimann | B29C 66/474 |
| | | | | 156/1 |
| 2017/0334147 | A1* | 11/2017 | Mayer | B29C 66/73116 |
| 2019/0126562 | A1* | 5/2019 | Mayer | B29C 66/3022 |
| 2021/0146635 | A1* | 5/2021 | Mayer | B29C 66/7294 |

FOREIGN PATENT DOCUMENTS

| WO | 2017162693 | A1 | 9/2017 |
|---|---|---|---|
| WO | 2018015527 | A1 | 1/2018 |

* cited by examiner

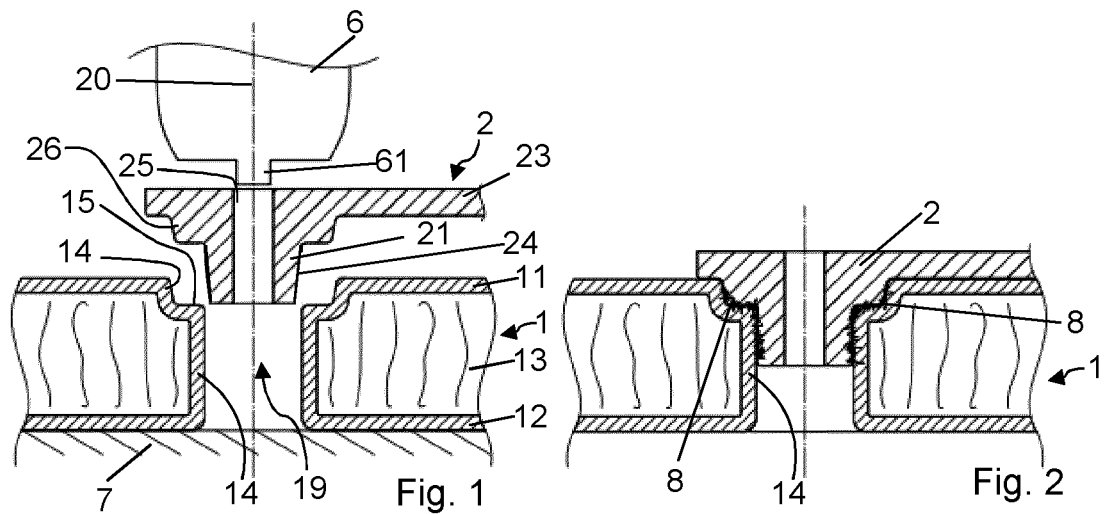
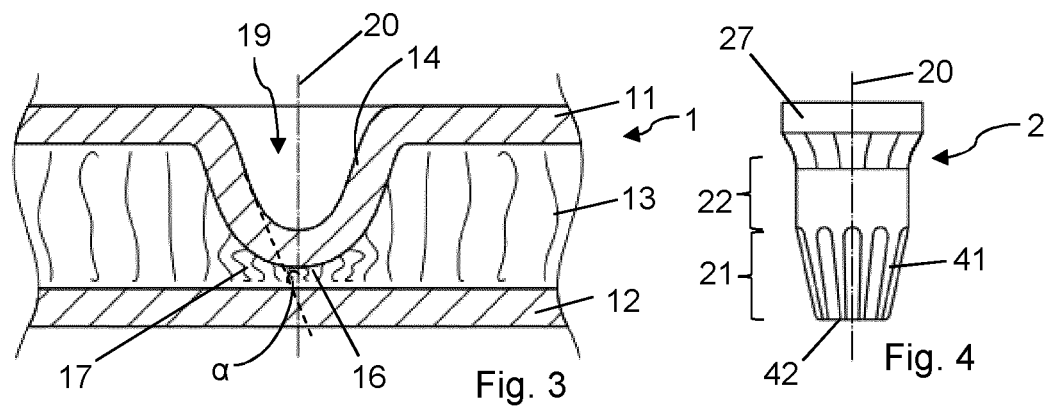
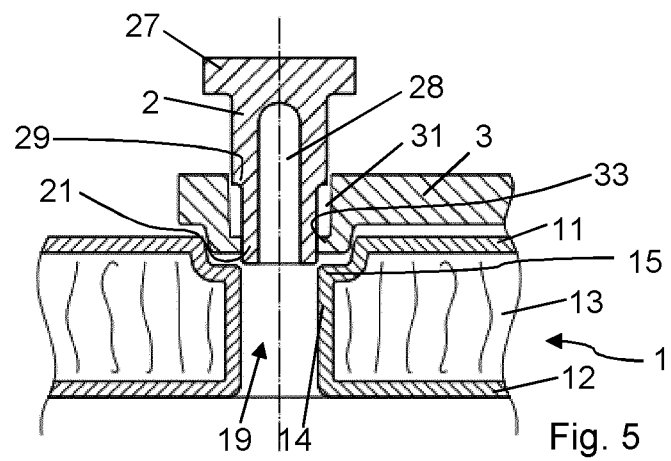

SECURING A SECOND OBJECT TO A FIRST OBJECT

FIELD OF THE INVENTION

The invention is in the fields of mechanical engineering and construction, especially mechanical construction, for example automotive engineering, aircraft construction, shipbuilding, machine construction, toy construction etc. In particular, it relates to a method of—mechanically—anchoring a connector in a first object.

BACKGROUND OF THE INVENTION

In the automotive, aviation and other industries, there has been a tendency to move away from steel-only constructions and to use lightweight material instead.

An example of new building material elements are lightweight building elements that comprise two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

Sandwich boards or similar lightweight elements may be used in the car, aerospace, or other industry and may form or be part of a compartment cover, an (instrumental, roof, interior) panel, car upholstery, load floors, etc.

Lightweight building elements offer relatively little anchoring strength if a conventional fastener, such as a screw pin or rivet, is fastened thereto. They therefore cause new challenges when being bonded to each other or to other elements.

Other relatively lightweight materials that may constitute challenges when bonding objects thereto include fibrous materials or different foams, including foams of metals, or polymers. Still further materials comprise composites, for example composites of fibers and polymers.

WO 2017/162693 discloses an approach according to which a connector is anchored in a lightweight building element by bringing a distal end face of the connector in contact with the first outer building layer and punching out a portion of the first outer building layer by the connector, for example using the effect of mechanical vibration coupled into the connector while it is pressed against the first outer building layer. After being pushed through the first outer building layer, the connector is anchored in the interlining layer by liquefied thermoplastic material of the connector interpenetrating structures of the interlining layer.

Also WO 2018/015527 discloses a method of anchoring a connector in a first object which is for example a lightweight building element. The method comprises anchoring the connector in the interlining layer by deforming the interlining layer and causing liquefied thermoplastic material of the connector to interpenetrate structures of the deformed interlining layer WO 2016/198547 discloses anchoring a connector in for example a lightweight building element, wherein the connector pierces the first building layer of the lightweight building element, advances through the interlining layer and is caused to be pressed against an inner surface of the second building layer, so that it becomes flowable at an interface to the second building layer and interpenetrates structure of an interface region between the interlining layer and the second building layer.

The approaches of WO 2017/162693, WO 2018/015527, and WO 2016/198547 have in common that anchoring takes place between the building layers of the lightweight building element, in structures of the interlining layer. Depending on the structure and composition of the interlining layer, the anchoring strength may be limited and/or subject to fluctuations. Also, often the expected mechanical loads are perpendicular to the layer plane, so that the loads are coupled into the lightweight building elements as bending forces on the building layers. This may lead to shear stress within the bent building layers, leading to a risk of delamination. Also, the stiffness in directions perpendicular to the layer plane tends to be rather limited.

Also, the first outer building layer has to be removed (in some embodiments of WO 2018/015527) or penetrated (WO 2017/162693, WO 2016/198547, other embodiments of WO 2018/015527). The former requires an additional processing step, and the latter increases the required process energy.

A special problem that may arise with the approaches that comprise pressing an at least partly thermoplastic element in a lightweight building element while mechanical energy is coupled into it, for example according to WO 2017/162693, WO 2018/015527, or WO 2016/198547, is process control due to often inevitable inhomogeneities of the interlining layers. Especially, it has to be ensured that for samples with a comparably low interlining layer thickness, the force by which the connector is pressed into the lightweight building element and the velocity by which this is done are not so high as to push the connector through the second outer building layer, which usually has to remain intact. This special problem may according to a first option be addressed by a servo control of the unit that applies the mechanical energy and pushes the connector forward (for example vibration generating unit). According to a second option, a brake mechanism is used. In this, a resistance, of for example between 150 kPa and 500 kPa (the units being in force per interface area defined by the distal end of the connector), is defined and applied by the brake during the forward movement. The brake mechanism may for example be implemented by a hydraulic brake. It reduces the processing velocity and thereby ensures that there is no incident of the connector temporarily, for example after having broken through the first outer building layer, encounters almost no mechanical resistance and consequently dashes through the interlining layer and possibly even the second building layer.

While both these options work well, the first option makes the apparatus used for the process more expensive, and the second option brings about additional energy consumption.

SUMMARY OF THE INVENTION

It is therefore an object of the present invention to provide a method of manufacturing an assembly of a first object (for example a lightweight building element) and a second object secured thereto, which method overcomes disadvantages of prior art methods and for example especially provides advantages in anchoring strength, reliability and/or energy consumption.

The invention according to a first aspect thereof concerns a method of manufacturing an assembly from a first object and a second object. In this, the first object is provided with a pre-shaped indentation having a mouth in a proximally facing surface portion and defining an indentation sidewall. The sidewall may especially have a same texture as the proximally facing surface in a region around the mouth. The indentation extends (mainly) below (distally of) said proximally facing surface portion. The mouth may especially be flush with the proximally facing surface portion, wherein the proximally facing surface portion may be extended to form an extended, plane surface of the first object, having for example an area larger (for example much larger) than an area defined by the mouth of the indentation. In embodiments, the proximally outer surface portion may even be a proximally outermost surface portion of the first object. The first object for example does not have any raised portion between the proximally facing surface portion and the sidewall. Thus, the sidewall may be continuous with the proximally facing surface portion and being bent away from a plane defined by this proximally facing surface portion in a convex manner, without any inflection point. The indentation may extend from the proximally facing surface portion in a smooth fashion without forma a sharp edge.

The method further comprises providing the second object, wherein the second object comprises an outer surface portion. The outer surface portion and/or the sidewall comprises a thermoplastic material, wherein the outer surface portion is a lateral outer surface portion with respect to an axis. The second object is brought in contact with the first object so that the lateral outer surface is in physical contact with the sidewall. Mechanical energy, especially mechanical vibration energy or rotation energy, is coupled into at least one of the objects, for example into the second object, so as to cause energy absorption due to friction between the lateral outer surface and the lateral wall, until a flow portion of the thermoplastic material becomes flowable (liquefied) and flows relative to the respective other object. During coupling mechanical energy into the second object (and/or the first object; and possibly also before and/or after this step), also a pressing force may be coupled into the second object, the pressing force pressing the second object towards the first object, i.e. pressing the portion of the second object that extends into the indentation further into the indentation. After resolidification of the thermoplastic material, the flow portion secures the second object to the first object. This may be due to interpenetration of structures of the first object or second object, respectively, especially of the lateral wall, by the flow portion so that after re-solidification a positive fit results. In addition or as an alternative, both objects may comprise a thermoplastic material, i.e., the first object may comprise thermoplastic material capable of being welded to the thermoplastic material of the second object, whereby a weld results between material portions of the first and second objects.

In this, 'pre-shaping' refers to a process that shapes the indentation and that is different from a material removal process. Rather, a shaping process is a process in which the shape of the object is defined in a state where the material of the object is shapable (flowable or at least plastically deformable) whereafter the material is hardened. Such hardening may be an irreversible or reversible process. An example of a shaping process is a molding process. Also a (hot) deformation process, in which the first object material is at least locally heated and brought into a plastically deformable state, and then a shaping tool (molding tool) is used for deforming, may be viewed as a kind of a molding process. As an alternative, also additive manufacturing (3D-printing) may be used.

In embodiments in which anchoring comprises interpenetration of structures of the first object by thermoplastic material of the second object, such structures may be pre-existing, for example in that the first object has an open cell structure. In addition or as an alternative, such structures may comprise structures that are generated in the first object by the process of the thermoplastic material of the second object interpenetrating it. For example, this may be the case if the first object comprises a foam (such as a closed-pore foam) that is of a material that is deformable at least when the flowable thermoplastic material of the second material (that is at an elevated temperature) impinges on it—for example if the first object comprises a thermoplastic foam.

In an embodiment, the second object is of plastics, preferably thermoplastics, and the first object is an element from a foam plastics, such as EPS or EPP. In this, the first and/or second object may be made by a molding process.

In embodiments (this also applies to the second aspect described hereinafter), the second object has an anchoring portion adapted to the indentation for there being an interference fit (press fit). This may mean that an outer cross section (for example characterized by a diameter) of the anchoring portion is slightly larger than a dimension of the indentation (in a cross section perpendicular to a proximo-distal axis; for example characterized by an inner diameter of the indentation). More in general, a dimension of the anchoring portion (such as its diameter) may be larger than a corresponding dimension of the indentation (such as its diameter) by for example at least 2% or at least 5%, and for example by at most 20% or at most 15%, such as by an amount between 2% and 20%, for example between 5% and 15%, especially by about 10%.

A condition for the sidewall of the indentation is that it has a same texture as the proximally facing surface around the mouth of the indentation. Especially, there may be a smooth transition between the surface around the mouth of the indentation and the sidewall—in contrast for example to bores where there is a rim at the mouth of the opening.

In a group of embodiments, the second object is a lightweight building element that has a for example comparably dense and hard first outer building layer and a for example less dense and usually softer interlining layer. The interlining layer may have been assembled with/attached to the first outer building layer in a previous step.

Applied to such lightweight building elements, the approach according to the first aspect of the invention implies that indentation is formed by the first outer building layer, i. e. the first outer building layer is shaped to constitute the sidewall of the indentation, too. More in particular the indentation has a mouth in a first outer building layer plane and has a sidewall of the material of the first outer building layer.

The invention according to another, second aspect, therefore, concerns a method of manufacturing a lightweight building element assembly. The assembly firstly comprises a first object being a lightweight building element that has a first outer building layer and an interlining layer, wherein the first outer building layer may be thinner and more dense (and may be generally also harder as far as the—average—hardness of the interlining layer is defined) than the interlining layer. The assembly further comprises a second object secured to the first object. The method comprises firstly providing the first object, wherein the first object has an indentation formed by the first outer building layer. More in particular the indentation has a mouth in a first outer building layer plane and has a sidewall of the material of the first outer building layer. Especially, the first outer building may have a plane portion around the indentation and a sidewall portion laterally lining the indentation, the sidewall portion meeting the plane portion at the mouth of the indentation and being contiguous with the plane portion. The indentation may form a blind opening or a through opening in the first object. The method further comprises providing the second object, wherein the second object comprises an outer surface portion of a thermoplastic material, wherein the outer surface portion is a lateral outer surface portion with respect to an axis.

The method also according to the second aspect comprises bringing the second object in contact with the first object so that the lateral outer surface is in physical contact with the sidewall, and coupling mechanical energy, especially mechanical vibration energy or rotation energy, into the second object so as to cause energy absorption due to friction between the lateral outer surface and the lateral wall, until a flow portion of the thermoplastic material becomes liquefiable and flows relative to the lateral wall. During coupling mechanical energy into the second object (and possibly also before and/or after this step), also a pressing force may be coupled into the second object, the pressing force pressing the second object towards the first object, i.e. pressing the portion of the second object that extends into the indentation further into the indentation. In addition to causing the flow portion to become flowable, the friction caused by the mechanical energy input also may cause an at least partial roughening, disruption and/or even breaking open of the first outer building layer, yielding spaces for the flow portion to flow into. Such spaces may in addition or as an alternative also be present in form of a suitable roughness already prior to the onset of the frictional forces.

After re-solidification of the thermoplastic material, the flow portion secures the second object to the first object. This may be due to interpenetration of structures of the first object, especially of the lateral wall, by the flow portion so that after re-solidification a positive fit results. In addition or as an alternative, the first outer building material may comprise thermoplastic material capable of being welded to the thermoplastic material of the second object, whereby a weld results between material portions of the first and second objects.

In embodiments that comprise a weld (this pertains to both, the first and second aspects of the invention), an additional advantage of the approach according to the invention is that an overall area of the weld is larger than if a connector of similar dimensions was welded to just a plane surface of the first object (for example lightweight building element).

In this text, the part of the second object that during the process is caused to be in contact with the indentation and that has the lateral outer surface portion is sometimes called anchoring portion. The anchoring portion may be at least in part cylindrical and/or tapered; this includes the possibility that the anchoring portion may be stepped. "Cylindrical" and "Tapered" in this text include the possibility that the lateral outer surface has a structure that is symmetrical about an axis. However, not circular cylindrical or tapering structures are a possibility as well.

In embodiments, the second object is a connector. In a special group of embodiments, the second object may comprise a screw thread (inner or outer screw thread), for example of a metal, so as to be capable of serving as a nut or screw of a connection.

In contrast to the prior art approaches, the method according to the second aspect of the present invention suggest not to rely on removing or breaking through the first outer building layer at the location of the anchoring of the second object but to shape the first outer building layer in a manner that it accommodates the second object—namely by having the indentation—and to use the mechanical strength of the first outer building layer for strengthening the anchoring of the second object. Similarly, referring also to the first aspect, also for other objects than lightweight building elements, the strength of the surface of a pre-shaped indentation is used for anchoring.

Because the first outer layer has a shape deviating from just plane and parallel to the lightweight building element plane, the first outer building layer is loaded at least partially in the plane direction if an axial force acts on the anchored the second object. This leads to higher stability and higher stiffness. Further, the first outer building layer, the solidity of which is often much higher than the solidity of the interlining layer is used also deep in the lightweight building element structure, whereby a connection having a much higher resistance is created.

Moreover, because the first outer building layer is used also deep in the structure of the lightweight building element, the processing zone in which the anchoring is achieved has, compared to the prior art, a much higher homogeneity in terms of material properties—for example the advancing portion of the second object may be in contact with the first outer building layer and possibly a layer immediately underneath (such as a foam layer) during the entire process.

Further, the pre-formed indentation gives the second object axial and lateral stability and guidance during the entire process. This simplifies the processing.

Also, by the approach according to the second aspect of the present invention, the energy consumption is reduced compared to the prior art approaches in that considerably less material of the second object has to be made flowable for the anchoring to work. This is due to the fact that for a solid anchoring in the interlining layer, a substantial volume has to be filled by the flow portion of the thermoplastic material—otherwise sufficient anchoring strength cannot be achieved. In contrast thereto, the material of the outer building layers is comparably dense and has a higher mechanical strength so that a sound anchoring becomes possible even if comparably little volume flows.

Further, the approach according to the present invention brings about additional mechanical stability compared to the prior art also with respect to lateral (transversal, i.e. in-plane) forces upon the second object relative to the first object the stability is strongly enhanced, since the first building layer not only supports the second object against axial forces but also against transversal forces, due to the sidewall formed by it.

The following applies to both aspects of the invention:

The mechanical energy may be mechanical vibration energy, wherein coupling the mechanical energy into the second object comprises pressing the second object against the first object towards distally by a vibrating sonotrode. In this, the vibration may especially be longitudinal vibration. Alternatively, other vibration energy is feasible, for example rotational vibration.

In a group of alternative embodiments, the mechanical energy may be mechanical rotation energy. Then, coupling the mechanical energy into the second object comprises pressing the second object against the first object towards distally while the second object is rotated relative to the first object. In this, the rotation may be continuous rotation, with a constant or non-constant rotation speed, or may be rotational vibration.

Combinations of vibration energy and rotation energy input are possible also.

In a group of embodiments with the first object being a lightweight building element, the first object has in addition to the first outer building layer a second outer building layer, the first and second building layers sandwiching the interlining. Then, if the indentation is a through opening, the sidewall may extend contiguously from the first building layer along the opening to the second building layer.

In a group of embodiments, the sidewall completely lines the indentation, whereby the interlining layer is not exposed at all but the entire surface of the first object in and around the indentation is formed by building layer material.

In embodiments, the sidewall and if applicable the bottom is not caused to be disrupted by the process. I.e., in these embodiments the indentation remains lined by building layer material, and the anchoring portion of the second object is fully anchored in the indentation and thus in building layer material.

In alternative embodiments, especially if the opening is a blind opening and the building layer material forms in addition to the sidewall also an indentation bottom, the building layer material lining the opening is disrupted during the process, whereby some liquefied thermoplastic material may flow through a disruption into the interlining. This may cause an additional anchoring effect by a blind-rivet like effect.

In these alternative embodiments, the disruption of the building layer material may be due to a piercing effect leading to a point-like disruption.

In embodiments also of the second aspect, the first object that comprises the indentation is manufactured by a primary shaping process, especially a molding process. In other words, the first building layer or both building layers is/are hardened after the indentation has been formed. The building layer material at least partially lining the indentation is thus deformed to have the indentation in a liquid or plastically deformable state and is hardened by curing or cooling thereafter.

In embodiments, the lightweight building element with the first outer building layer, the interlining layer and, if applicable, the second outer building layer is pre-manufactured without the indentation. Then, the first outer building layer is deformed in a deep-drawing like process (or embossing process).

This does not only cause the first outer building layer as a whole to become deformed to comprise the indentation but in addition also ensures a re-orientation of the fibers along the direction into the indentation in the wall around the indentation—for example along the indentation axis if the wall is perpendicular to the layer plane. Generally, the in-plane stiffness of a fiber composite goes with the fourth power of the cosine of the fiber angle.

In addition, this process causes the interlining layer to be compacted locally underneath the indentation, this again leading to an enhanced support.

In embodiments, especially the manufacturing of the lightweight building element comprises that fiber mats (for example glass fiber mats) are positioned on the interlining layer, and then the fiber mats are sprayed by a matrix material (for example polyurethane). Subsequently, for the deformation process, the resulting pre-manufactured assembly is positioned in a press comprising the indentation shaping feature. In this press, also the consolidation of the matrix material takes place. In such embodiments, in addition to the mentioned effects of fiber re-orientation and interlining layer material compacting, also an enrichment of the content of matrix material immediately underneath (distally of) the deep-drawn portion of the first outer building layer results, and hence in the example of a suitable PU matrix material a structurally more solid foam.

Therefore, the indentation is present when the second object is brought in contact with the first object, and the second object is not used for forming the indentation.

The approach of providing the indentation in a primary shaping process provides the significant advantage that the shape of the indentation may be precisely defined and is independent of—often somewhat inhomogeneous—properties of the interlining layer. Since the approach makes possible that the shape of the indentation is freely choosable and precisely definable, the anchoring properties can be tailor-made according to the specific application dependent needs. This also applies if the first object is not a lightweight building element according to the terminology used in this text.

The following still applies to both aspects:

In embodiments, the indentation is at least partly cylindrical or at least partly conical. The indentation may also have a stepped shape, with a step between cylindrical or conical portions.

In embodiments, the anchoring portion forms a hollow space. Such hollow space may have a mouth at the distal end of the anchoring portion. At least at the distal end, the anchoring portion may then be essentially tube-shaped. The hollow space may optionally (if the application permits) extend axially through the entire second object whereby it forms a second object through opening.

In embodiments, the lateral outer surface portion has a structure of indentations and ridges. For example the ridges may form axially running lamellae. In addition or as an alternative, the lateral outer surface portion may also comprise circumferentially running ridges or other shapes. Such structures of the lateral outer surface portion may have energy directing properties and thereby help to reduce the required energy consumption.

Especially in a group of embodiments, the second object may comprise addition to the anchoring portion, a functional structure. Such functional structure may be a connecting structure defining a connecting location, especially a connecting location defined with respect to all dimensions (x,y,z). Especially, the functional structure (the connecting location if the functional structure is a connecting structure) may be off-center with respect to an insertion axis (comprising to an axis of the indentation) so that the orientation of the connector about the insertion axis/indentation axis (generally the proximodistal axis that may be central with respect to the anchoring portion) determines the position and orientation of the connecting location. In this, the functional structure is for example different from a fastening hole (with our without a thread) coaxial with the indentation axis, from a coaxial peg or threaded bar protruding towards proximally, from a head, etc. or any other conventional fastening structure of a known fastener. It may, however, comprise a fastening hole, peg, etc. that is off-center with respect to the named indentation axis.

As an alternative to being a connecting structure, the functional structure may comprise a functional element itself, for example a sensor or actuator.

As an alternative to the second object comprising a functional structure one-piece with the anchoring portion, the method may comprise providing an initially separate functional element.

For example, the functional element may have a functional element through opening through which the second object—serving as a fastener—extends during the anchoring process. The functional element through opening may comprise a step and/or taper, so that it narrows towards distally. This may serve for securing the functional element to the first object by the second object, in addition or as an alternative to the second object having a head the distally-facing surface of which is pressed against a proximally facing surface portion of the functional element around the functional element through opening.

The method may comprise a self-centering/pre-positioning step. The shape of the second object (or anchoring portion thereof) and the indentation are such that the second object/anchoring portion can be manually or automatically pre-inserted in the step of bringing the second object in contact with the first object, before the energy is coupled into the second object. This prepositioning may optionally be done with a press fit as explained hereinbefore.

For all embodiments, it is an option to carry out the step of bringing the second object in contact with the first object using the tool (such as sonotrode) by which in the subsequent step the mechanical energy is coupled into the second object. To this end, for example a vacuum system may be provided that cooperates with the tool and holds the second object relative to the tool.

In embodiments in which the mechanical energy is mechanical vibration energy, the sonotrode may optionally be flat at the distal end, with no feature that demands a precise relative x-y-position (position in directions perpendicular to the proximodistal axis). Thus, in such embodiments it may especially be the indentation that defines the second object's position, and not the sonotrode.

In embodiments, the functional element may be thermoplastic at least in parts and may be caused to be welded to the second object during the process.

It is also possible that the functional element comprises a structure having pores or other undercuts or being capable of developing pores, these structures being interpenetrated by liquefied thermoplastic material of the second object during the anchoring process, whereby after re-solidification a positive fit connection between the (anchored) second object and the functional element results.

In embodiments, if the first object is a lightweight building element, the first building layer (and if applicable optionally both, the first and second building layers) comprises a fiber reinforcement, i.e., is of a fiber composite material. Especially, the first building layer (or both building layers) may comprise a glass fiber reinforcement and/or a carbon fiber reinforcement. As mentioned above, the manufacturing process may comprise a process step—such as the mentioned deep drawing/embossing step—that includes re-orienting the fibers. To this end, the fiber mat used may optionally have a structure especially suitable for draping. Such textile structures may for example include woven fabrics (especially elastic wovens, such as 1-4 wovens or even 1-8 wovens), knits, etc.

Similar considerations apply if the first object is not a lightweight building element but has another portion of a fiber composite material or consists of the fiber composite material. Also then, the manufacturing process that includes re-orienting the fibers.

A fiber reinforcement that lines the indentation has special advantages in combination with the approach according to the invention. In addition to the well-known advantage of providing additional stability, rigidity and ductility, the fiber reinforcement assist the anchoring process. Firstly, the fibers enhance friction and thereby energy absorption. Secondly, after onset of the mechanical energy input, the surface tends to become roughened even more, and possibly fibers tend to become exposed. This even further accelerates the energy absorption process and additionally provides structures for the thermoplastic material of the second object to flow into so as to ensure, after re-solidification, an especially strong anchoring., especially in embodiments in which the matrix material of the first outer building layer does not weld to the flow portion (for example if it is not even thermoplastic.

If the surface portion of the first object, for example building layer(s) is/are of a composite with the fiber reinforcement, the matrix material may be of any kind known for composite materials, including dense thermosets like epoxides, foaming thermosets like polyurethane, thermoplastics like polypropylene or polystyrene, etc. As an even further option, the building layer(s) may be of a primarily compacted fiber material, stabilized by a thermoplastic or thermosetting binder.

Generally, in building layers with dense thermosets as matrix materials, anchoring will take place where the building layer is locally damaged or even disrupted. Optionally, this may include a distal perforation and lateral flow out of this perforation.

In building layers with a foaming thermosetting matrix, this will in addition or as an alternative comprise anchoring in a residual porosity in the first outer building layer induced by the foaming process.

In building layers with a thermoplastic matrix, in addition or as yet another alternative, the anchoring will comprise a weld if the matrix material and the thermoplastic material of the second object are capable of being welded together. Since due to the approach according to the invention, the interface area between the first and second objects is comparably large, sufficient anchoring may result even if the weldability itself is comparably weak. Additionally, the thermal process may cause a local melting of the matrix material and allow for pressure-induced local deformation making a positive fit connection (after re-solidification) possible.

In building layers that are primarily a compacted fiber material, anchoring will primarily be due to residual porosity interpenetrated by the thermoplastic material of the second object that will result, after re-solidification, in a positive fit connection.

As an alternative to being of a fiber composite, the proximally facing surface of the first object and the sidewall, for example constituted by the building layer(s), may be of any other suitable material including not fiber reinforced polymer, a metal, etc.

The interlining layer may for example comprise a macroscopic, dedicated structure with a large portion of hollow spaces, whereby the density of the interlining layer is comparably small. For example, the interlining layer may comprise vertically extending walls (walls extending parallel to the axis) between the first and second outer building layers. In embodiments, such walls form a honeycomb structure.

Examples such structures include cardboard structures, for example cardboard honeycomb structures, with or without impregnation. There also exist lightweight building elements that are suitable as first objects for the present invention and that have an interlining layer comprising a structure of thermoplastic walls, such as a thermoplastic, for example Polypropylene-honeycomb structure.

In addition or as an alternative, the interlining layer may comprise a porous material, such as a polymer foam.

The interlining layer may in addition to the dedicated structures and/or porous material also an adhesive, for example a foaming adhesive, such as a PU adhesive, at the interface to the building layer(s) and the interlining.

Especially in embodiments in which the first object is not a lightweight building element with an interlining layer, the material may comprise a fleece or woven fabric, or may comprise a polymer-based material such as EPS, EPP etc.

In addition to concerning a method, the present invention also concerns assemblies substantially as manufactured by any method described or claimed in this text.

In this text the expression "thermoplastic material being capable of being made flowable e.g. by mechanical vibration" or in short "liquefiable thermoplastic material" or "liquefiable material" or "thermoplastic" is used for describing a material comprising at least one thermoplastic component, which material becomes liquid (flowable) when heated, in particular when heated through friction i.e. when arranged at one of a pair of surfaces being in contact with each other and vibrationally moved relative to each other, wherein the frequency of the vibration has the properties discussed hereinbefore. In some situations, for example if the connector has to carry substantial loads, it may be advantageous if the material has an elasticity coefficient of more than 0.5 GPa. In other embodiments, the elasticity coefficient may be below this value.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably comprises a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally comprise a polymeric component that is not cross-linked covalently or cross-linked in a manner that the cross-linking bonds open reversibly upon heating to or above a melting temperature range. The polymer material may further comprise a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s), of the thermoplastic material.

For example, a non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also comprise a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its coupling-out face oscillates predominantly in the direction of the tool axis (longitudinal vibration) and with an amplitude of between 1 and 100 μm, preferably around 30 to 60 μm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side would be a "foot portion".

BRIEF DESCRIPTION OF THE DRAWINGS

In the following, ways to carry out the invention and embodiments are described referring to drawings. The drawings are schematical. In the drawings, same reference numerals refer to same or analogous elements. The drawings show:

FIG. 1 a configuration with a first object, a second object, and a sonotrode;

FIG. 2 an assembly manufactured from the configuration of FIG. 2;

FIG. 3 an alternative first object;

FIG. 4 an alternative second object;

FIG. 5 an alternative configuration with a separate functional element;

FIGS. 1-3 and 5-11, 15 and 16 all depict the shown elements in section through a plane through the axis of the indentation (in FIG. 16, for illustration purposes the lamella structure of the second object's anchoring portion is shown in side view). FIG. 4 shows a side view of the depicted second object. FIGS. 12-14 show schematical top views, and FIGS. 17-19 depict views from an oblique angle.

DESCRIPTION OF THE PREFERRED EMBODIMENTS

Figure 6:
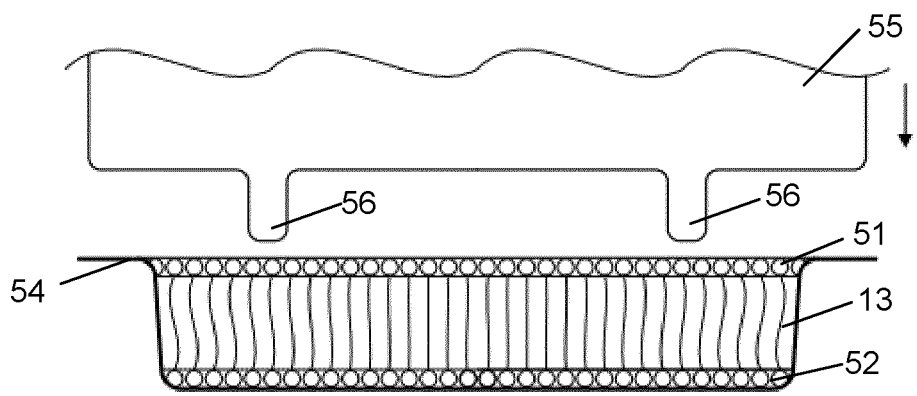
FIGS. 6 and 7 manufacturing a first object.

FIG. 1 depicts a configuration with a first object 1 being a lightweight building element, a second object 2 and a sonotrode 6. The first object is placed on a non-vibrating support 7.

The first object has a first (proximal) outer building layer 11, a second outer building layer 12 and an interlining layer 13 sandwiched between the first and second outer building layers. The first outer building layer moreover forms an indentation 19 with a sidewall 14. The first outer building layer is essentially plane around the indentation 19. The sidewall is contiguous with the plane portion around the indentation.

The outer building layer(s) may have material characteristics as know in the relevant industry. Cars for example often have parts with a soft or carpet wooly/furry surface that is often non-woven.

In the depicted embodiment, the indentation forms a through opening through the first object 1. Also, in the depicted embodiment the sidewall 14 is contiguous with the second outer building layer 12, too.

The indentation in the depicted embodiment has a stepped shape with a shoulder 15 formed between a proximal sidewall 14 segment (upper sidewall segment in FIG. 1) and a distal (lower) sidewall segment 14.

The indentation may be rotationally symmetrical about an axis 20.

The second object 2 of FIG. 1 is an example of a second object that has a thermoplastic anchoring portion as well as a functional portion. The second object in this embodiment thus serves both, as connector and as functional part in that the anchoring portion is not formed by a separate element but is a portion of the part itself that is to be fastened to the first object. Embodiments that have an anchoring portion and a functional portion feature the substantial advantage that no separate connector has to be manufactured so that less parts are required in assembly processes.

The functional portion 23 is, in the embodiment of FIG. 1, one-piece with the anchoring portion 21 and is only partially illustrated. The functional part may for example comprise a connecting structure (not shown in FIG. 1) such as a peg or stud, a fastening hole, a sliding block, a button, etc. At may in addition or as an alternative carry other functional element such as a sensor, a transducer, etc.

The anchoring portion 21 forms a distal anchoring protrusion that forms a lateral (with reference to the axis 20) outer surface 24. The anchoring portion may optionally be symmetrical about the axis, for example rotationally symmetrical or symmetrical with respect to rotations around the axis by a defined discrete angle. The entire second object 2 in FIG. 1 does not have any symmetry with respect to the axis due to the functional portion.

The lateral outer surface 24 in FIG. 1 is slightly tapering. Alternatively, it may be essentially cylindrical.

For anchoring the second object 2 relative to the first object 1 the sonotrode 6 is used to press the anchoring portion into the indentation while mechanical vibrations are coupled into the anchoring portion. In the embodiment of FIG. 1, the anchoring portion has an opening 25 open towards proximally so that a guiding protrusion 61 of the sonotrode 6 may engage. In FIG. 1, the opening 25 is an axially running through opening. The anchoring portion 21 thereby is tube-like.

Due to the effect of the mechanical vibration, friction energy is absorbed at the interface between the anchoring portion and the first outer building layer material, until material of the connector becomes flowable and flows relative to the first object. FIG. 2 illustrates the assembly after the process. A flow portion 8 has interpenetrated structures of the first outer building layer material to anchor the second object 2 relative to the first object 1 by a positive fit connection and/or by a weld to matrix material of the first outer building layer/lateral wall.

In the embodiment of FIGS. 1 and 2, the anchoring portion 21 is stepped so as to cooperate with the stepped indentation. A distally facing shoulder 26 of the anchoring portion towards the end of the anchoring process is pressed against the shoulder 15 formed by the indentation, whereby an axial position of the second object relative to the first object is defined, and also additional interface area is created between the first and second objects in the region where a flow portion is generated.

FIG. 3 shows, as a variant, a first object 1 with an indentation 19 that does not form a through hole but a blind hole. The indentation therefore has in addition to a sidewall 14 also an indentation bottom 16. Sidewall and indentation bottom together line the indentation without any interruption, i.e. the building layer material completely shields the interlayer in and around the indentation.

Underneath (distally of) the indentation bottom, the interlining layer material forms, due to the above-described manufacturing process, a dense zone 17.

Anchoring takes place in the same way as illustrated referring to FIGS. 1 and 2.

As a further difference to the embodiment of FIGS. 1 and 2, the indentation is illustrated to have a sidewall 14 that is not cylindrical but that tapers. The taper angle α (in the definition used in this text and illustrated in FIG. 3, the taper angle α is the angle of the tapering surface with respect to the axis 20, thus half of the cone opening angle) in the design of the assembly is a degree of freedom that may be adapted to the angle of a possible taper of the anchoring portion. For example, the tapering angle α of the lateral sidewall may be equal to or smaller than the anchoring portion tapering angle. In special situations, for example if enhanced anchoring at the distalmost part of the anchoring portion is desired, the tapering angle of the lateral sidewall may also be greater than the tapering angle of the anchoring portion.

The features of the sidewall being tapering and of the indentation forming a blind opening are independent of each other. Thus, also a through opening of the kind shown in FIG. 1 may have a tapering sidewall, and also a blind opening may have a cylindrical lateral sidewall.

FIG. 4 shows an embodiment of a second object 2 that in contrast to the embodiment of FIG. 1 is not a connector that comprises a functional portion but a separate connector for cooperating with a separate functional element. The connector has the anchoring portion 21 as well as a proximal portion 22 that for example extends through a through opening in the functional element. The second object 2 in FIG. 4 further has a head portion 27; the structure of the proximal portion of a standalone connector as shown in FIG. 4 may be chosen to match with the functional element.

The anchoring portion 21 in FIG. 4 is tapering. It may comprise a structure of axially running lamellae 41 with indentations 42 between them or other structure deviating from a smooth conical or cylindrical outer surface. Such structure may bring about energy directing properties, i.e. due to them the energy input required for an onset of liquefaction is reduced.

FIG. 5 shows an arrangement of a first object 1 and a functional element 3 to be secured to the first object together with a second object 2 being a connector for fastening the functional element to the first object. In FIG. 5, the indentation 19 is illustrated to be a through opening. The functional element 3 has a functional element through opening 31 through which the second object 2 extends. After the second object 2 is anchored, with the anchoring portion 21 secured to the lateral wall 14 as in the above-described embodiments, the functional element is clamped between the second object's head portion 27 and the first object 1.

In the embodiment of FIG. 5, further (optional) features of an arrangement with a functional element 3 initially separate from the second object are illustrated:

The functional element through opening 31 is not cylindrical but is stepped or narrows otherwise towards distally. In FIG. 5, an inward flange 33 forms an according inward shoulder. Consequently, a second object distally facing shoulder 29 may be pressed against this inward shoulder during the process to additionally secure the functional element 3 against the first object 1.

Further, the functional element 3 at least in a region of the functional element through opening 31 is of thermoplastic material liquefiable by the mechanical vibration energy. This may be used in one or both of the following ways:

Firstly, the mechanical vibration may be coupled through the second object into the functional element also (for example via the shoulders 29, 33 of the second object and the functional element) and may cause a liquefaction of thermoplastic material also of the functional element in contact with the first object. In the configuration of FIG. 5, thermoplastic material of the distalmost part of the functional element, at the distal surface of the inward flange 33 is pressed against the shoulder 15 of the indentation 19. A flow portion of material of the functional element may interpenetrate material of the first outer building layer 11 and/or be welded thereto. Secondly, a weld between the second object and the functional element may be caused. In FIG. 5, this may for example be the case where the shoulders 29, 33 meet.

The second object has a hollow space 28 open towards distally. Due to the hollow space 28, the anchoring portion 21 is essentially tube-like, similarly to the embodiment of FIG. 1. Such a hollow space 28 or through opening 25 is an option for any embodiment of the invention. It reduces the overall amount of material needed and makes the second object lighter. It may be open towards distally, proximally or both. It is often preferable that it is open at least towards distally.

FIG. 6 illustrates a manufacturing process of a first object with indentations 19. Two layers of glass or carbon fibers soaked by liquid, PU forming material compositions 51, 52 sandwiching a dimensionally stable interlayer structure 13 (for example a honeycomb structure of a Polypropylene or cardboard or a foam, such as a PU foam) are placed in a first (lower) mold part 54. A second mold part 55 that comprises shaping protrusions 56 for the indentations is pressed against this pre-product. Due this the effect of the shaping protrusions 56, the interlayer is locally deformed and displaced. For example accelerated by the effect of a heat input, the PU forming material compositions are polymerized, whereby the first and second building layers 11, 12 comprising fiber reinforced PU are generated. If the compositions 51, 52 are of the foaming type or if in addition the compositions a foaming composition is provided, a foam filling 58 will be generated in the interlining layer structure, for example predominantly at the interfaces to the first and second building layers.

Figure 7:
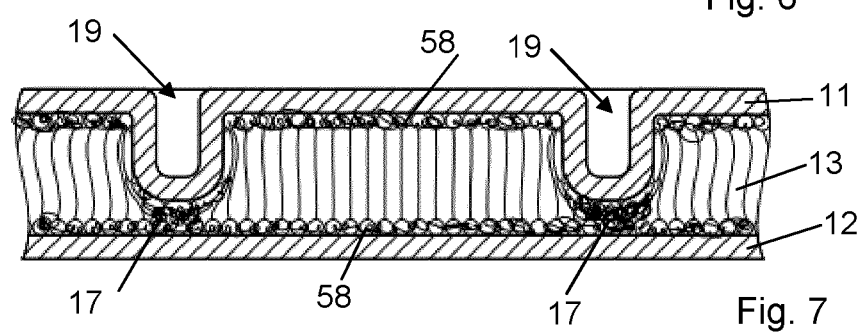

FIG. 7 shows the resulting first object, illustrated to have two indentations 19 being blind holes. The deformation process will lead to a re-orientation of the fibers, a local compaction of the interlining layer (dense zone 17), and possibly also to a matrix material (foam) enrichment and/or compaction yielding porosity for the anchoring process, in addition or as an alternative to a residual porosity between the fibers of the first building layer material.

Figure 8:
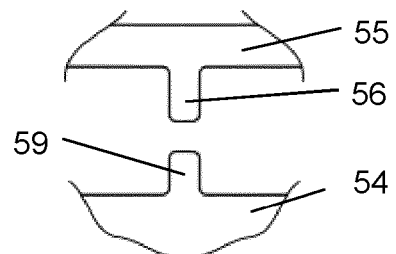
FIG. 8 a detail of mold parts for a manufacturing process.

If the indentation 19 is to be a through opening then the shaping protrusion(s) 56 can be longer so that they extend to the first mold part 54, or the first mold part may have first mold part shaping protrusions 59 at corresponding positions, as shown in FIG. 8. In either case, after forming of the first and second building layers, a thin residual layer of building layer material may remain and may have to be removed in a separate step.

The process as illustrated in FIGS. 6-8 when used for producing the first object with the indentation being a through hole brings about a special advantageous feature. At the distal end of the shaping protrusion(s) 56 or 56/59, respectively, there will be an increased density of reinforcing fibers, compared to the lateral wall due to smaller pressure. As a consequence, the porosity is locally enhanced in the wall, which may be beneficial for the anchoring process. This increased fiber density is due to the fact that the reinforcing fibers have a certain length and hence have, compared to the matrix material, less tendency to flow sideways. In the configuration of FIG. 8 with shaping protrusions coming from both sides, this increased density of fibers can be observed around the location where the two shaping protrusions meet. An additional effect can be the already mentioned re-orientation of the fibers due to the draping effect caused by the deformation process.

Figures 9, 10:
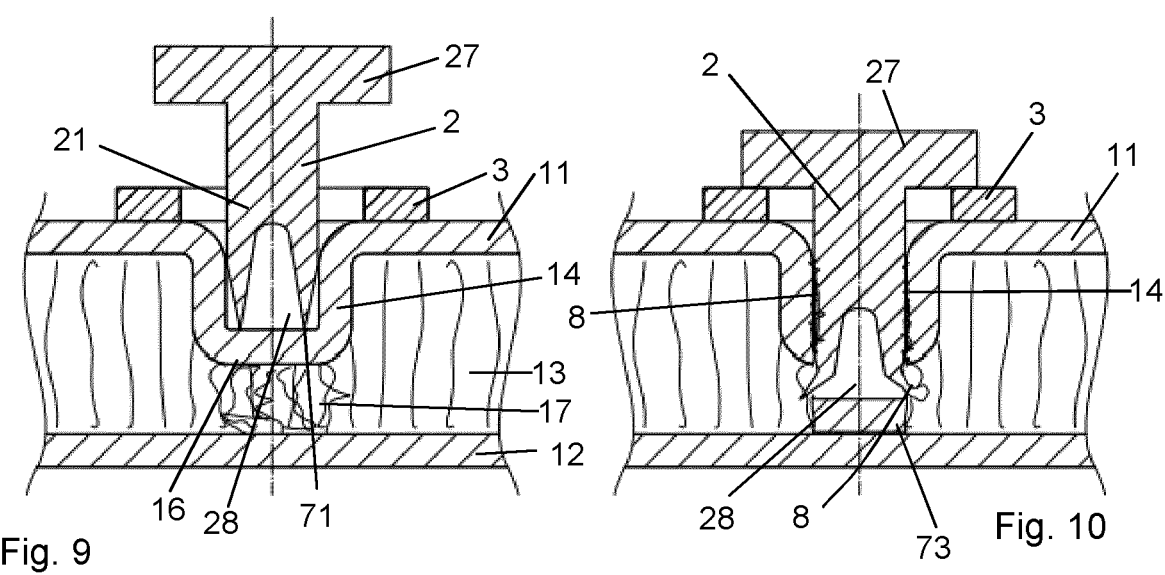
FIG. 9 an even further configuration of a first object, a second object and a functional element.
FIG. 10 an assembly manufactured from the configuration of FIG. 9.

In the above-described embodiments, the building layer material lining the indentation is assumed to be left intact during the process, and the interlining material remains shielded by the building layer material so that the anchoring portion of the second object does not get into contact with it. FIG. 9 illustrates an example of an alternative embodiment. The second object is provided with a distal piercing or punching structure. In FIG. 9, the anchoring portion 21 has a circular distal punching edge 71. During the anchoring process, the sonotrode presses the second object towards distally. This causes the first building layer at the bottom 16 of the indentation to be pierced or punched through. After the process, the second object will be anchored with respect to both, the sidewall 14 and the interlining.

FIG. 10 illustrates the situation after anchoring, i.e. after the thermoplastic material has re-solidified. The flow portion 8 of the thermoplastic material, comprises both, portions that have flown into structures of the sidewall, for example structures formed by exposed fibers, and portions that have interpenetrated the interlining. A punched-out piece 73 of the first building layer is displaced towards distally. The hollow space 28 may comprise debris of interlining material and/or first building layer material.

As an alternative to being punched out, a bottom 16 of the indentation may be removed prior to the anchoring process, for example by drilling.

Figure 11:
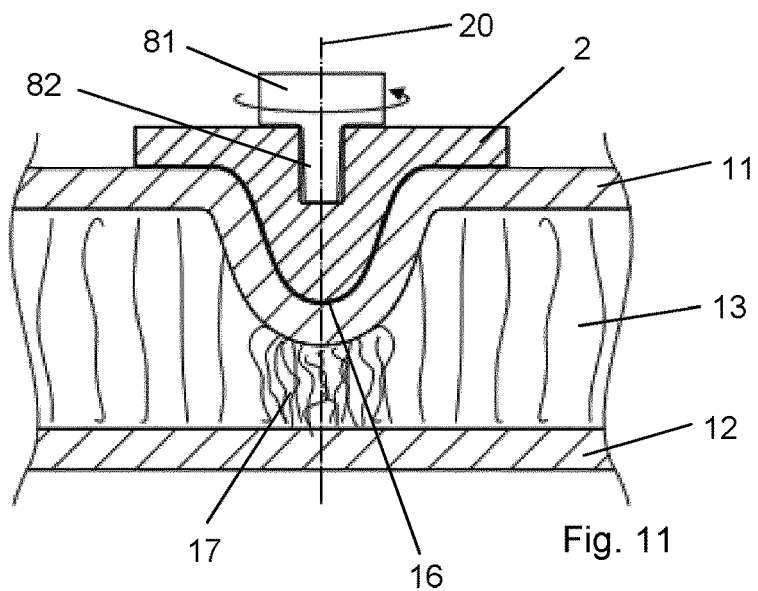
FIG. 11 a configuration with a first object, a second object, and a rotation tool.

FIG. 11 illustrates the possibility that the mechanical energy input in addition or as an alternative to comprising mechanical vibration may comprise (oscillatory or continuous) rotation of the second object 2 relative to the first object. To this end, the first object may be mounted in a fixed orientation, and the second object may be pressed against the first object by a rotation tool 81 rotating around the axis 20. For rotational coupling, the second object 2 may have a not rotationally symmetrical ("rotationally symmetrical" here implying rotational symmetry with respect to rotation about any angle, i.e. the coupling structure may optionally have a discrete symmetry, such as by being hexagonal or quadratic or star-shaped in cross section or slit-shaped) coupling structure, such as a coupling indentation, cooperating with a mating rotation tool coupling structure, such as a coupling protrusion 82.

Energy input by rotational energy in addition or as an alternative to (for example longitudinal) vibration is an option for all illustrated and herein discussed embodiments, provided however, that the second object will, in many embodiments and differently from what is for example illustrated in FIG. 4, have no outer structure macroscopically deviating from a rotational symmetry around the axis 20 (but may have the mentioned coupling structure).

Figure 12:
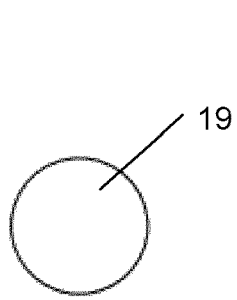
FIGS. 12-14 different cross sections of indentations (and of according portions)
Figure 13:
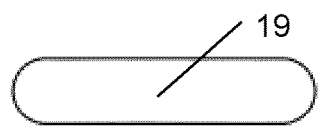
Figure 14:
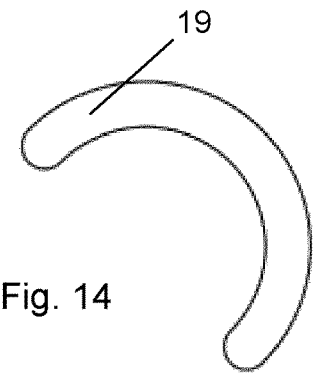

In the previously described embodiments, the indentation was assumed to be approximately round in cross section, i.e. rotationally symmetrical (with respect to rotation about any angle) about the axis 20. With the partial exception of the configuration of FIG. 11 that concerns the input of rotational energy, this need not be the case. Rather, as an alternative to being round (FIG. 12) in cross section, the indentation 19 may have any other shape, such as oblong (FIG. 13), oblong-curved (FIG. 14), etc. FIGS. 12-14 all schematically show cross sections through a plane perpendicular to the axis.

The anchoring portion of the second object may have an approximately adapted cross section, which however may deviate from the cross section of the indentation, for example by comprising a structure of the above-described kind with lamellae or similar.

It is, however, also possible that the outer cross section of the anchoring portion has an overall shape that differs from the cross section of the indentation, for example in that the anchoring portion is generally round (with the exception of the energy directing structures) whereas the indentation is for example oblong. Then, the resulting anchoring of the anchoring portion will be anisotropic, with a dominant anchoring at the side face portions where the indentation is narrower. This may be used for intentional anisotropies in the bending strength/flexibility, or also for some tolerance compensation.

Figure 15:
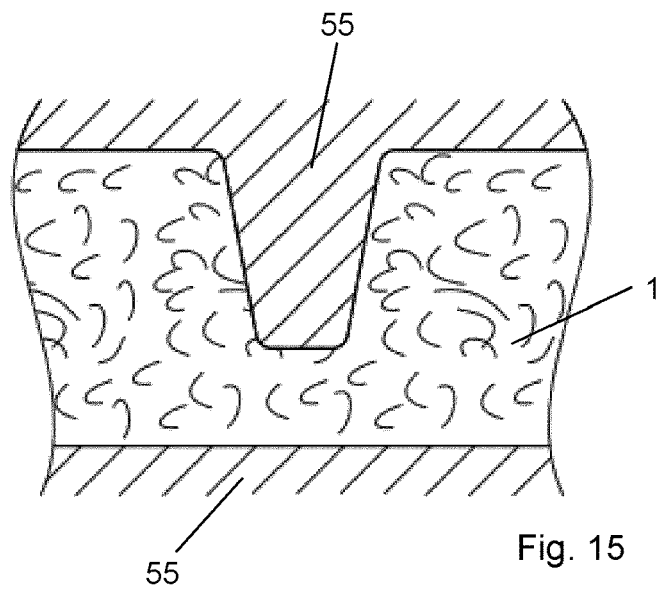
FIGS. 15 and 16 a method of manufacturing an alternative first object, and a configuration for anchoring a second object therein, respectively.

FIG. 15 illustrates the principle that it is possible to make another object than a sandwich board by the primary shaping process. The first object 1 may for example comprise a structure of soaked fibers placed in a mould 55 having a salient feature that forms the indentation.

Figure 16:
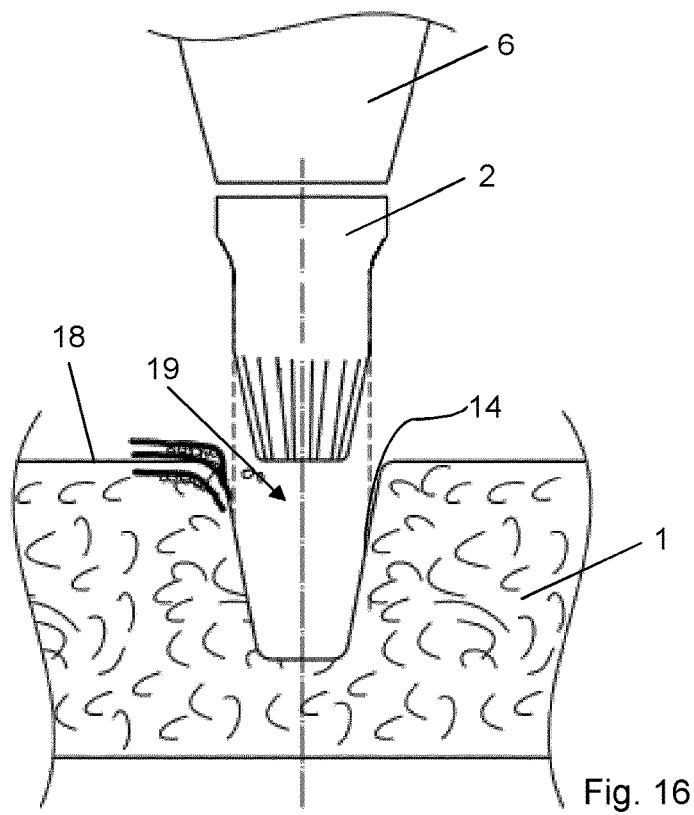

FIG. 16 shows the set-up for anchoring, including a second object 2 and a sonotrode. Another feature illustrated in FIG. 16, which is independent on the nature of the first object 1, is that the anchoring portion shaped to be inserted into the indentation and the indentation are adapted to each other for a press-fit, in that the anchoring portion is slightly oversized compared to the dimensions of the indentation (see the dashed lines). The anchoring method may especially comprise inserting the second object into the indentation so that a press-fit results (i.e. the second object is provisionally fixed to the first object) prior to the mechanical vibration energy input.

In the previously described embodiments, it is the first outer building layer of the lightweight building element that forms the surface both, of the sidewall and of the proximally facing surface portion around the mouth of the indentation. Like in these embodiments, in the embodiment of FIGS. 15 and 16 there is a smooth, continuous transition between the proximally facing surface portion 18 around the mouth and the sidewall 14. Also, both have a same texture.

Object 1 as shown in all figures, but especially as shown in FIG. 16, may be a homogeneous body, such as a block of foam with an indentation. As can be seen in FIG. 16, the surface portion 18 and sidewall 14 have the same texture.

Figure 17:
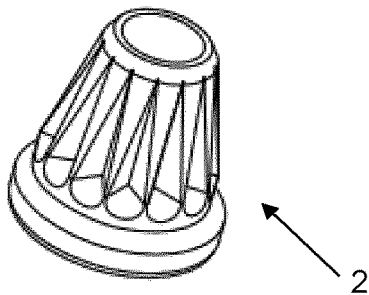
FIGS. 17-19 different second objects.
Figure 18:
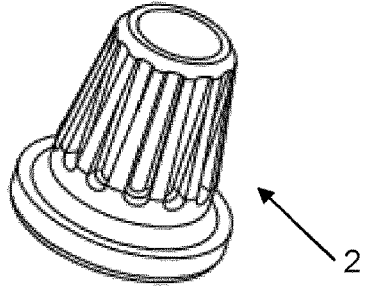
Figure 19:
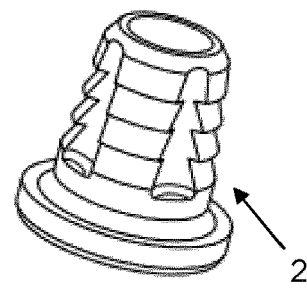

FIGS. 17-19 yet show different second objects 2. The embodiment of FIG. 17 has axially running ridges between which grooves of approximately triangular cross sections are established, wherein the grooves are, given the conical shape of the second object 2, deepen towards proximally. In the embodiment of FIG. 18, the grooves are not triangular but rectangular in cross section. In further variants, the overall second object is not conical but cylindrical, and the axial length of the grooves/ridges may be chosen differently, with an example being shown in FIG. 4. FIG. 19, finally, shows an example with ridges that do not run into axial directions but circumferentially.

Generally, the second object's anchoring portion in embodiments may have a conical shape up to approx. 30 degrees cone angle or be cylindrical. The external wall of the anchoring portion may contain features that act as energy directors, particularly vertical ridges or groove (with respect to the proximodistal direction) that are parallel to each other. The maximum number of grooves on the perimeter is a function of the insert portion's diameter, cone angle and the groove geometry. The grooves can have a triangular cross-section with an angle at the bottom of the groove ranging from 10 to 90 degrees or more, or a rectangular cross-section with or without rounded edges at the bottom of the grooves. Some other groove shapes could be imagined. The number of grooves can be chosen so that they don't overlap, as to retain the conical or cylindrical body (outer profile) between the grooves. The cross-section of the grooves changes along the height of the pin (insertion direction) when the anchoring portion is conical, being deeper at the top (bigger diameter of the cone) and shallower at the bottom of the cone.

What is claimed is:

1. A method of manufacturing an assembly, comprising the steps of:
providing a first object,
wherein the first object has a proximally facing surface portion,
wherein the first object has an indentation having a mouth in the proximally facing surface portion, the indentation being manufactured by pre-shaping, the indentation having a sidewall;
providing a second object that has a lateral outer surface portion,
wherein at least one of the lateral outer surface portion and the sidewall comprises a thermoplastic material;
bringing the second object in contact with the first object so that the lateral outer surface portion is in physical contact with the sidewall;
coupling mechanical energy into at least one of the first and second objects so as to cause energy absorption due to friction between the lateral outer surface portion and the sidewall, until a flow portion of the thermoplastic material becomes liquefied; and
letting the flow portion re-solidify, whereby the flow portion secures the second object to the first object, and
wherein the flow portion interpenetrates the side wall of the first object to form a positive fit after resolidification.

2. The method according to claim 1, wherein the sidewall has a same texture as the proximally facing surface portion in a region around the mouth.

3. The method according to claim 1, wherein the indentation extends from the proximally facing surface portion in a smooth fashion without forming a sharp edge.

4. The method according to claim 1, wherein the step of providing the first object comprises manufacturing the first object by a primary shaping process, wherein the indentation is shaped by the primary shaping process, and wherein the indentation is formed during manufacturing of the first object.

5. The method according to claim 4, wherein the primary shaping process is a molding process, and wherein the indentation and the complete first object are shaped in a same mold.

6. The method according to claim 4, wherein the primary shaping process is a one-step process, and/or
wherein the first object comprises a polymer material, and the polymer material is caused to harden during the primary shaping process.

7. The method according to claim 1, wherein the second object has an anchoring portion having an outer contour adapted to the indentation,
wherein an outer diameter of the anchoring portion is adapted to the indentation to yield an interference fit, and
wherein a dimension of the anchoring portion is larger than a corresponding dimension of the indentation by between 2% and 20%.

8. The method according to claim 1, wherein the indentation forms a blind opening in the first object, the blind opening having a bottom with the same texture as the proximally facing surface portion in a region around the mouth.

9. The method according to claim 1, wherein the indentation forms a through opening and wherein the sidewall extends contiguously from the proximally facing surface portion of the first object with unchanged texture.

10. The method according to claim 1, wherein during the step of coupling mechanical energy into the second object, structures interpenetrated by the thermoplastic material of the second object are generated in the first object, and/or
wherein the first object comprises a foam, and/or
wherein the first object is a lightweight building element having a first outer building layer and an interlining layer, the first outer building layer is thinner and denser than the interlining layer, and the first outer building layer is shaped to constitute the sidewall of the indentation, and/or
wherein the first object is a rear panel shelf or a panel for a car motor.

* * * * *